United States Patent
Wang et al.

(10) Patent No.: US 7,869,118 B2
(45) Date of Patent: Jan. 11, 2011

(54) METHOD OF FABRICATING ELECTRO-PHORETIC DISPLAY

(75) Inventors: Yi-Ching Wang, Hsinchu (TW);
Po-Wen Hsiao, Hsinchu (TW);
Ted-Hong Shinn, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 120 days.

(21) Appl. No.: 12/406,962

(22) Filed: Mar. 19, 2009

(65) Prior Publication Data

US 2010/0178430 A1    Jul. 15, 2010

(30) Foreign Application Priority Data

Jan. 9, 2009    (TW) ............................... 98100784 A (51) Int. Cl.
*G02B 26/00*    (2006.01)
*G09G 3/34*    (2006.01)
(52) U.S. Cl. ....................... 359/296; 345/107
(58) Field of Classification Search ................. 359/296; 345/107; 430/32; 204/600
See application file for complete search history.

(56) References Cited

U.S. PATENT DOCUMENTS 7,691,248 B2 *    4/2010    Ikeda et al. ................. 204/623

* cited by examiner

*Primary Examiner*—William C Choi
(74) *Attorney, Agent, or Firm*—Chun-Ming Shih (57) ABSTRACT

A method of fabricating electro-phoretic display is performed by the steps of: providing a first electrode substrate and a second electrode substrate disposed above the first electrode substrate in an electro-phoretic liquid, wherein the first electrode substrate comprises a substrate and a plurality of pixel electrodes disposed on the substrate; putting at least a charged micro-capsule between the first electrode substrate and the second electrode substrate in the electro-phoretic liquid; making the electricity of a portion of the pixel electrodes is opposite to the electricity of the charged micro-capsules for attracting the charged micro-capsules to above the portion of the pixel electrodes. Since the charged microcapsules are disposed on the pixel electrodes immediately and the microcapsules corresponded to the same pixel electrode have a plurality of colorful charged particles with the same color, the electric-phoretic display fabricated by this method may not only have high reflectivity and transmittance, but also display a picture with single original color.

13 Claims, 10 Drawing Sheets

METHOD OF FABRICATING ELECTRO-PHORETIC DISPLAY

This application claims priority to a Taiwan application No. 098100784 filed Jan. 9, 2009.

BACKGROUND

1. Field of the Invention

The present invention is related to a method of fabricating a display device, and more particular to a method of fabricating an electro-phoretic display.

2. Description of the Related Art

Since the flexible display not only has advantages of light weight and thin thickness, but also has advantages of flexibility and is not easy to be broken. Therefore, the development of the flexible display panel has become increasingly important. Nowadays, the popular flexible display is the electro-phoretic display (so-called EPD). In the electro-phoretic display panel, the distribution of charged particles is controlled based on electric field to change the reflectivity of the display region with respect to the ambient light so as to display pictures. According to the display theory, the electro-phoretic display panel has bistability and needs not additional light source to illuminate, so it fills the bill of high power-saving in present flexible display panel.

Figure 1:
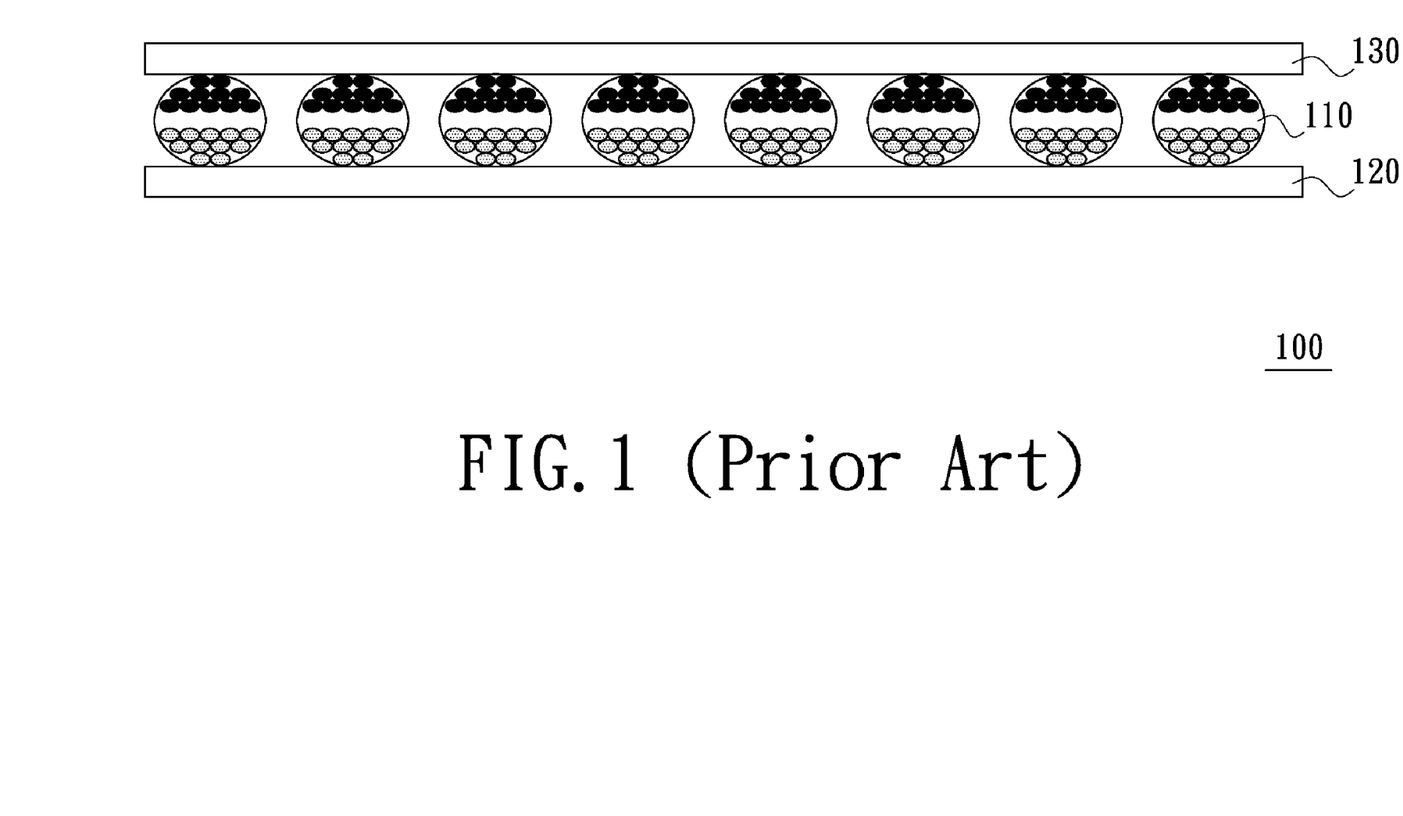
FIG. 1 is a schematic cross-sectional view of a conventional electro-phoretic layer.
Figure 2:
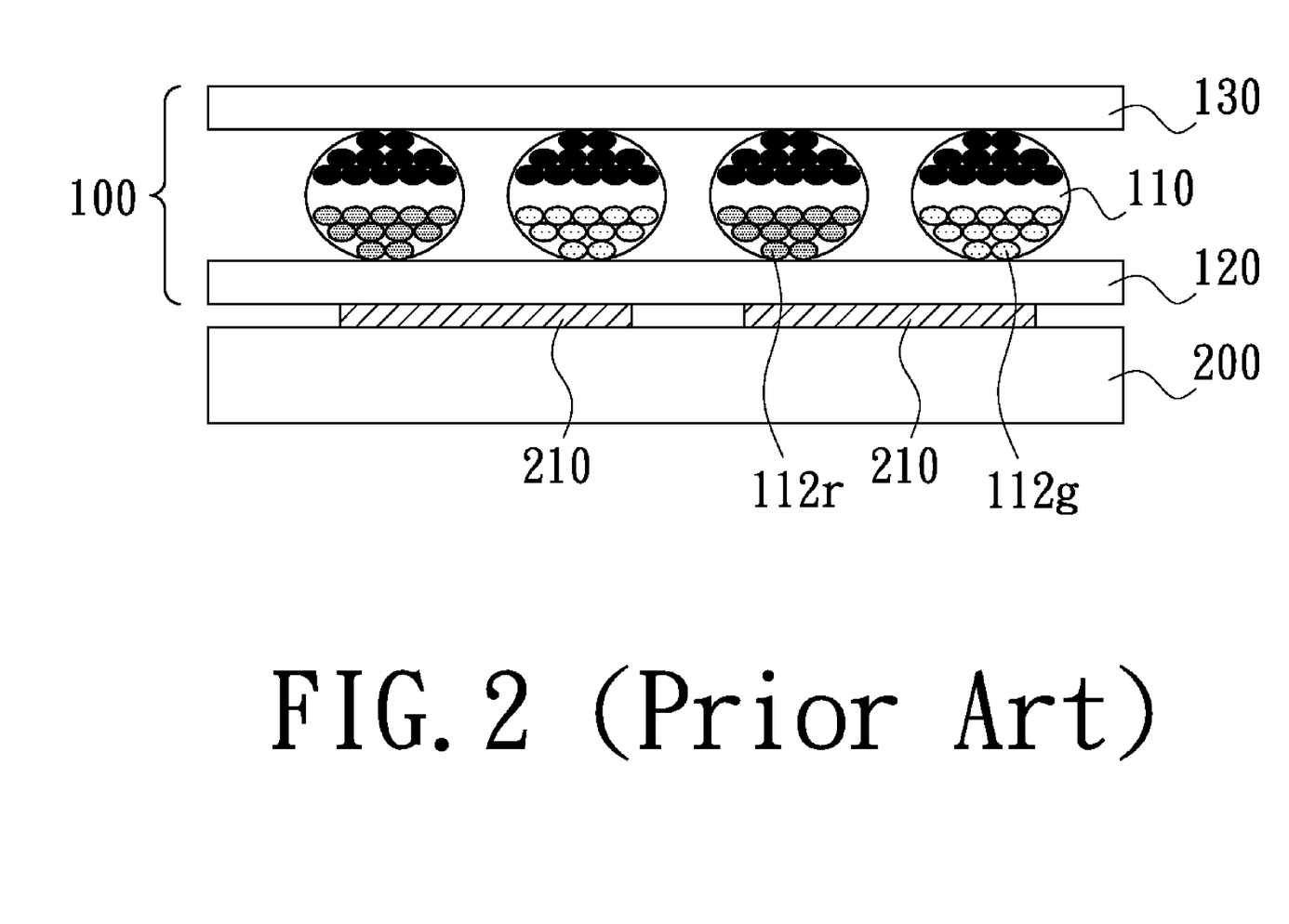
FIG. 2 is a schematic cross-sectional view of a portion of a conventional electro-phoretic display.

FIG. 1 is a schematic cross-sectional view of a conventional electro-phoretic layer. FIG. 2 is a schematic cross-sectional view of a portion of a conventional electro-phoretic display. Referring FIG. 1 and FIG. 2, during the fabricating process of the conventional electro-phoretic display, a plurality of electro-phoretic displaying units 110 such as, for example, electro-phoretic microcapsules or electro-phoretic microcups are disposed between a transparent substrate 120 and a transparent substrate 130 to form an electro-phoretic film 100, and then the electro-phoretic film 100 is smoothly attached on an active elements array substrate 200 as a electro-phoretic layer. However, the reflectivity and transmittance of the electro-phoretic display would be decreased by the transparent substrate 120 and the transparent substrate 130 of the electro-phoretic film 100.

In addition, for considering the brightness and the colorized of images displayed by the electro-phoretic display, the method of using the colored charged particles in the electro-phoretic displaying units 110 to display colored images is researched and developed by every manufacturer. However, since the interval between two adjacent electro-phoretic displaying units 110 in the electro-phoretic film 100 is different from the interval between two pixel electrodes 210 of the active elements array substrate 200, the electro-phoretic displaying units 110 with different colors are driven at the same time.

As shown in FIG. 2, if a portion of the electro-phoretic displaying unit 110 having the red charged particles 112r and a portion of the electro-phoretic displaying unit 110 having the green charged particles 112g correspond to the same pixel electrode 210, the color of the image displayed by applying a driving voltage to the pixel electrode 210 is red, green and mixing color thereof, not purely red or green. Accordingly, the chromatic performance of the images displayed by the conventional electro-phoretic display is undesired.

BRIEF SUMMARY

The invention is directed to a method of fabricating an electro-phoretic display for manufacturing the electro-phoretic display which can display images with a particular color.

The invention provides a method of fabricating an electro-phoretic display. First, an electro-phoretic liquid is provided. Next, a first electrode substrate and a second electrode substrate opposite to each other are putted in the electro-phoretic liquid, wherein the second electrode substrate is disposed above the first electrode substrate comprising a substrate and a plurality of pixel electrodes disposed thereon. Then, at least a charged micro-capsule is formed and putted between the first electrode substrate and the second electrode substrate. After that, the electricity of at least one of the pixel electrodes is made inverse to the electricity of the charged micro-capsule such that the at least a charged micro-capsule is attracted to above the at least one of the pixel electrodes.

In one embodiment of this invention, after the electricity of at least one of the pixel electrodes has been made inverse to the electricity of the at least a charged micro-capsule, the electricity of other pixel electrodes is equaled to the electricity of the at least a charged micro-capsule.

In one embodiment of this invention, there is a plurality of charged micro-capsules putted in the electro-phoretic liquid during the aforementioned fabricating process of the electro-phoretic display. The charged micro-capsules not attracted to above the at least one pixel electrode are further removed after the electricity of at least one of the pixel electrodes is made inverse to the electricity of the at least a charged micro-capsule. For example, the charged micro-capsules not attracted to above the at least one pixel electrode are removed by dumping or centrifugal removing.

In an embodiment of the invention, the charged micro-capsules have a plurality of colorful charged particles with the same color respectively.

In one embodiment of this invention, the process of making the electricity of at least one of the pixel electrodes be inverse to the electricity of the charged micro-capsule comprises applying an AC voltage or a DC voltage to the at least a pixel electrode. Furthermore, the AC voltage or the DC voltage applied to the at least a pixel electrode may be removed after the at least a charged micro-capsule is attracted to above the at least one of the pixel electrodes.

In one embodiment of this invention, the at least a charged micro-capsule is formed by providing at least a micro-capsule and a plurality of charges and making the charges attach to the at least a micro-capsule by, for example, attaching method or copolymerizing method.

In one embodiment of this invention, the electricity of the second electrode substrate is further equaled to the electricity of the at least a charged micro-capsule by, for example, applying AC voltage or DC voltage thereto.

In one embodiment of this invention, the at least a charged micro-capsule comprises at least a first charged micro-capsule and at least a second charged micro-capsule, the at least a first charged micro-capsule has a plurality of first colorful charged particles and the at least a second charged micro-capsule has a plurality of second colorful charged particles. Moreover, the electricity of at least one of the pixel electrodes is made inverse to the electricity of the charged micro-capsule by making the electricity of at least one of the pixel electrode inverse to the electricity of the at least a first charged micro-capsule and making the electricity of at least another one of the pixel electrode inverse to the electricity of the at least a second charged micro-capsule.

In one embodiment of this invention, a blocking layer is further formed on the first electrode substrate before putting the first electrode substrate in the electro-phoretic liquid. The adjacent pixel electrodes disposed on the first electrode substrate are separated by the blocking layer.

In the invention, each micro-capsule with colorful charged particles is polarized to be a charged micro-capsule, and then the voltage is applied to the pixel electrodes for attracting the charged micro-capsules. Thus, the positioning of the charged micro-capsules is achieved. As the aforementioned, the charged micro-capsules may be disposed immediately on the first electrode substrate, and the micro-capsules corresponded to the same pixel electrode have a plurality of colorful charged particles with the same color. Therefore, the electro-phoretic display fabricated by the method of the invention may not only have high reflectivity and transmittance, but also display a picture with single original color and improved chromatic performance.

In order to make the aforementioned and other objects, features and advantages of the invention comprehensible, preferred embodiments accompanied with figures are described in detail below. It is to be understood that both the foregoing general description and the following detailed description are exemplary, and are intended to provide further explanation of this invention as claimed.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 3A:
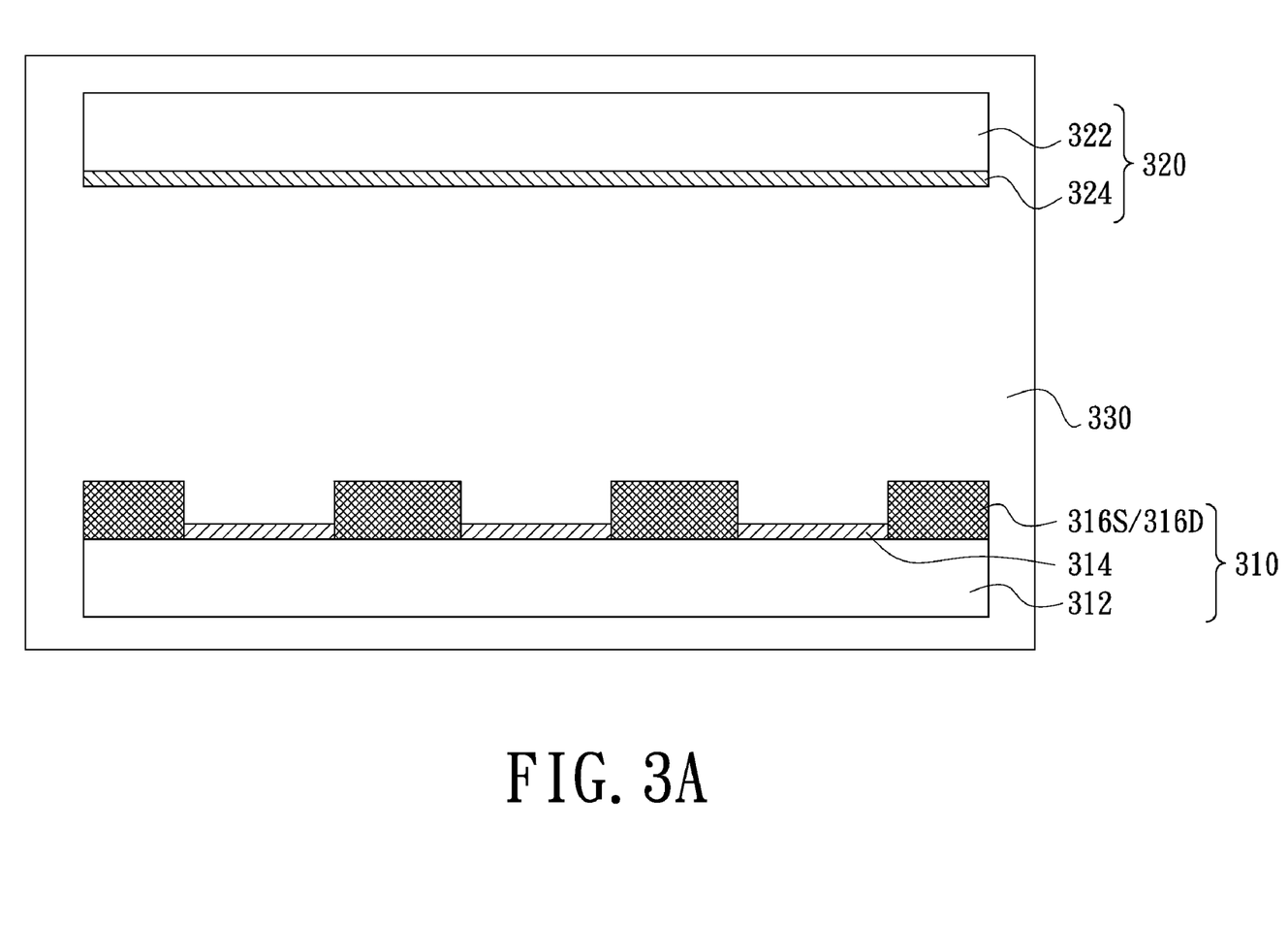
FIG. 3A to FIG. 3C respectively are schematic cross-section views illustrating the electro-phoretic display during the fabricating process thereof according to an embodiment of the invention.
Figure 3B:
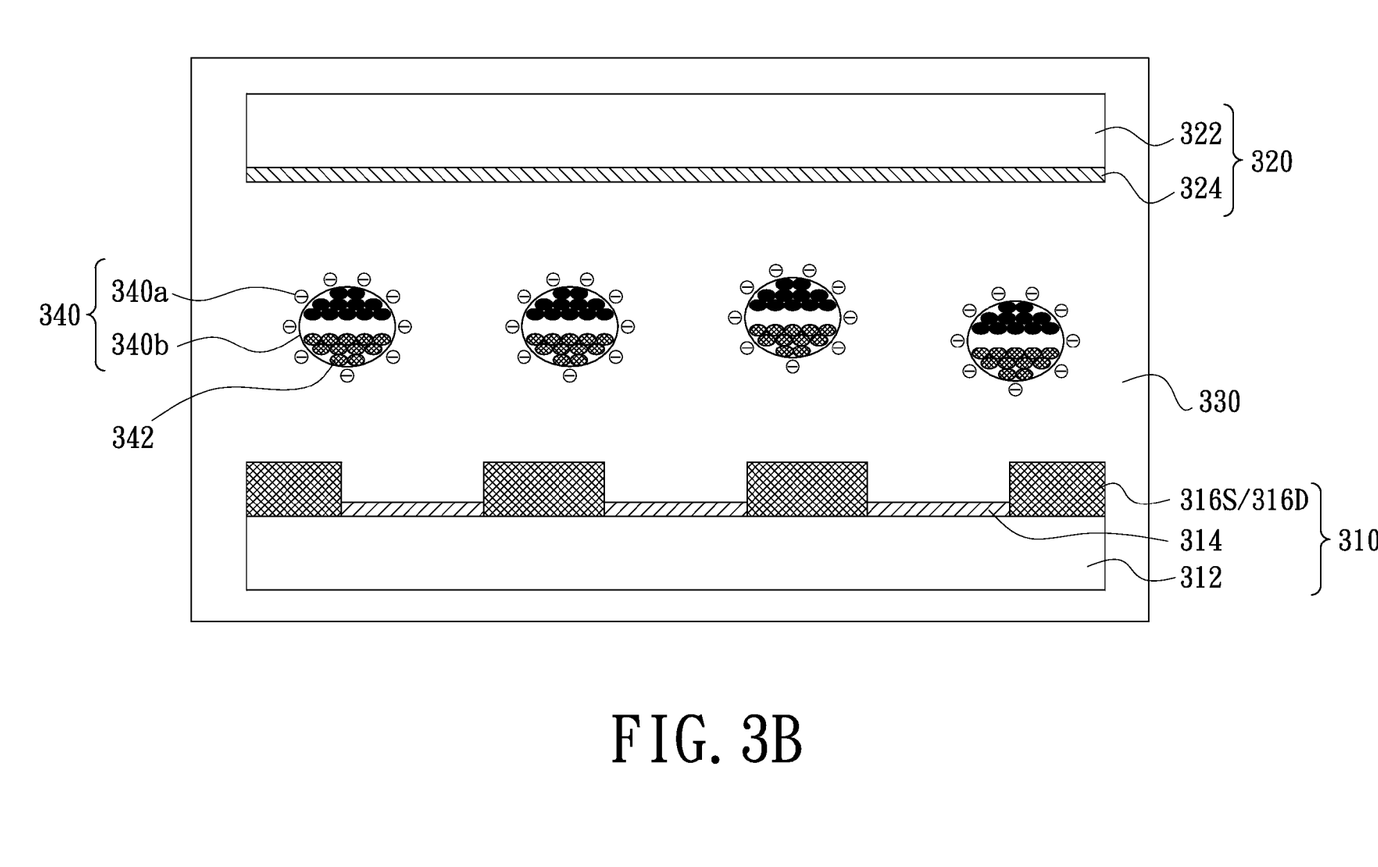
Figure 3C:
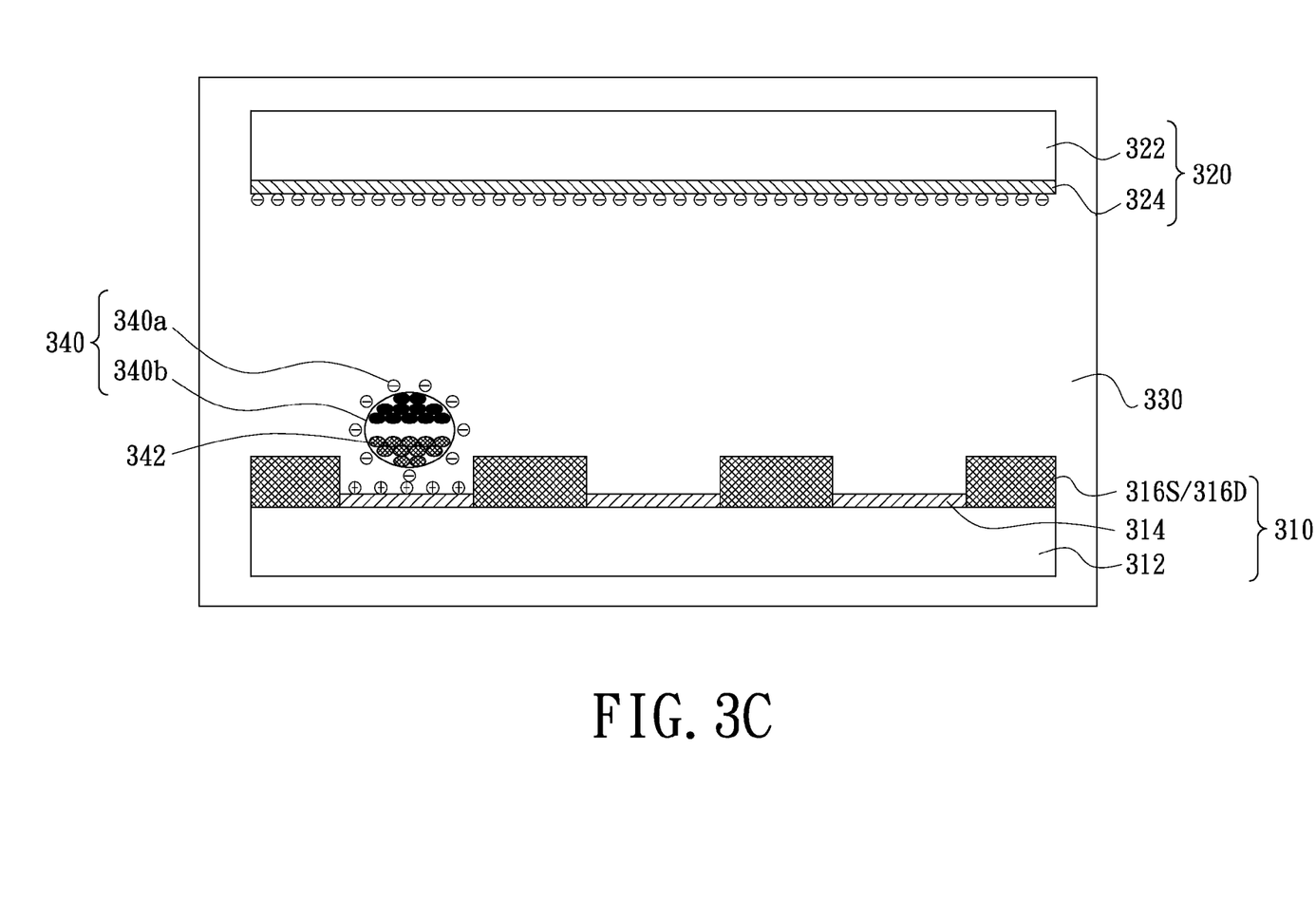

FIG. 3A to FIG. 3C respectively are schematic cross-section views illustrating the electro-phoretic display during the fabricating process thereof according to an embodiment of the invention. Referring to FIG. 3A, an electro-phoretic liquid 330 is provided and then a first electrode substrate 310 and a second electrode substrate 320 are putted on the electro-phoretic liquid 330. The second electrode substrate 320 comprising a substrate 322 and a transparent electrode layer 324 is disposed above the first electrode substrate 310 comprising a substrate 312 and a plurality of pixel electrodes 314 disposed thereon. In this embodiment, the materials of the substrate 312 may be metal, glass or plastic, such as polyethylene terephthalate (so-called PET), polyethylene naphthenate (so-called PEN), polyaramid, polyimide (so-called PI), polycycloolefin, polysulfone, epoxy, polycarbonate or polymethyl methacrylate (so-called PMMA). The materials of the substrate 322 are, for example, glass, the aforementioned plastic materials or other transparent materials, but the invention is not limited hereto.

Figure 4:
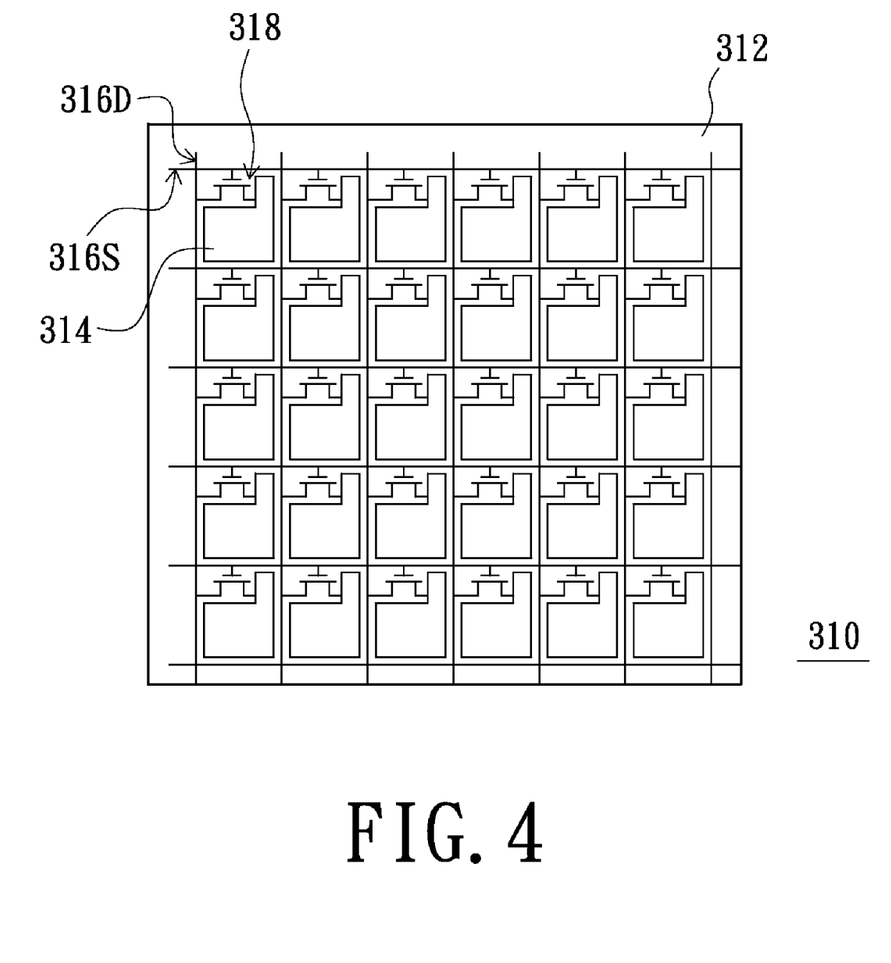
FIG. 4 is a schematic view illustrating the first electrode substrate according to an embodiment of the invention.

Specifically, the first electrode substrate 310 may be an active elements array substrate or a passive elements array substrate. In this embodiment, the first electrode substrate 310 is, for example, a thin film transistors array substrate, and there are not only pixel electrodes 314 disposed on the substrate 312, but also a plurality of scan lines 316S, a plurality of data lines 316D and a plurality of thin film transistors 318, as shown in FIG. 4.

Referring to FIG. 3B, at least a charged micro-capsule 340 is formed and putted between the first electrode substrate 310 and the second electrode substrate 320 in the electro-phoretic liquid 330. In this embodiment, a plurality of charged micro-capsules 340 is putted into the electro-phoretic liquid 330. Each charged micro-capsule 340 has a plurality of colorful charged particles 342. For example, the color of colorful charged particles 342 of any one of the charged micro-capsules 340 may comprise black and one of red, green and blue, or white and one of cyan, yellow and magenta.

Specially, the charged micro-capsules 340 putted into the electro-phoretic liquid 330 at the same turn have the colorful charged particles 342 with the same color. In other words, the charged micro-capsules 340 having the colorful charged particles 342 with different colors are putted into the electro-phoretic liquid 330 in turns.

In detail, the charged micro-capsules 340 comprise a micro-capsule 340b and a plurality of charges 340a and are formed through attaching the charges 340a to the micro-capsule 340b by attaching or copolymerizing method. In this embodiment, the diameter of the micro-capsule 340b is about 40 micrometer to 500 micrometer.

Referring to FIG. 3C, the electricity of parts of the pixel electrodes 314 of the first electrode substrate 310 is contrary to the electricity of the charged micro-capsules 340 putted into the electro-phoretic liquid 330, so that the charged micro-capsules 340 may be attached to above the pixel electrodes 314. That is, the parts of the pixel electrodes 314 are chosen according to the predetermined positions of the charged micro-capsules 340 and then the chosen pixel electrodes 314 are applied AC voltage or DC voltage for making the electricity thereof contrary to the electricity of the charged micro-capsules 340 after putting the charged micro-capsules 340 having the colorful charged particles 342 with the same color in the electro-phoretic liquid 330.

For this embodiment, since the charges 340a attached to the micro-capsules 340b are negative, the parts of the pixel electrodes 314 have positive charges by applying AC voltage or DC voltage thereto. Therefore, the charged micro-capsules 340 may be attached to above the pixel electrodes 314.

It should be noted that the number of the charged micro-capsules 340 attached to above the single pixel electrode 314 is not limited in the invention. The number of the charged micro-capsules 340 attached to above the single pixel electrode 314 is determined according to the size ratio of the pixel electrodes 314 to the charged micro-capsules 340. That is, in the electro-phoretic display fabricated by the method of the invention, each pixel electrode 314 is corresponded to one or several charged micro-capsules 340.

Additionally, the second electrode substrate 320 has a plurality of negative charges by applying DC voltage or AC voltage thereto while the parts of the pixel electrodes 314 have a plurality of positive charges by applying DC voltage or AC voltage thereto. Therefore, the charged micro-capsules 340 are excluded by the negative charges on the transparent electrode layer 324 and moves toward the pixel electrodes 314 quickly.

Figure 5:
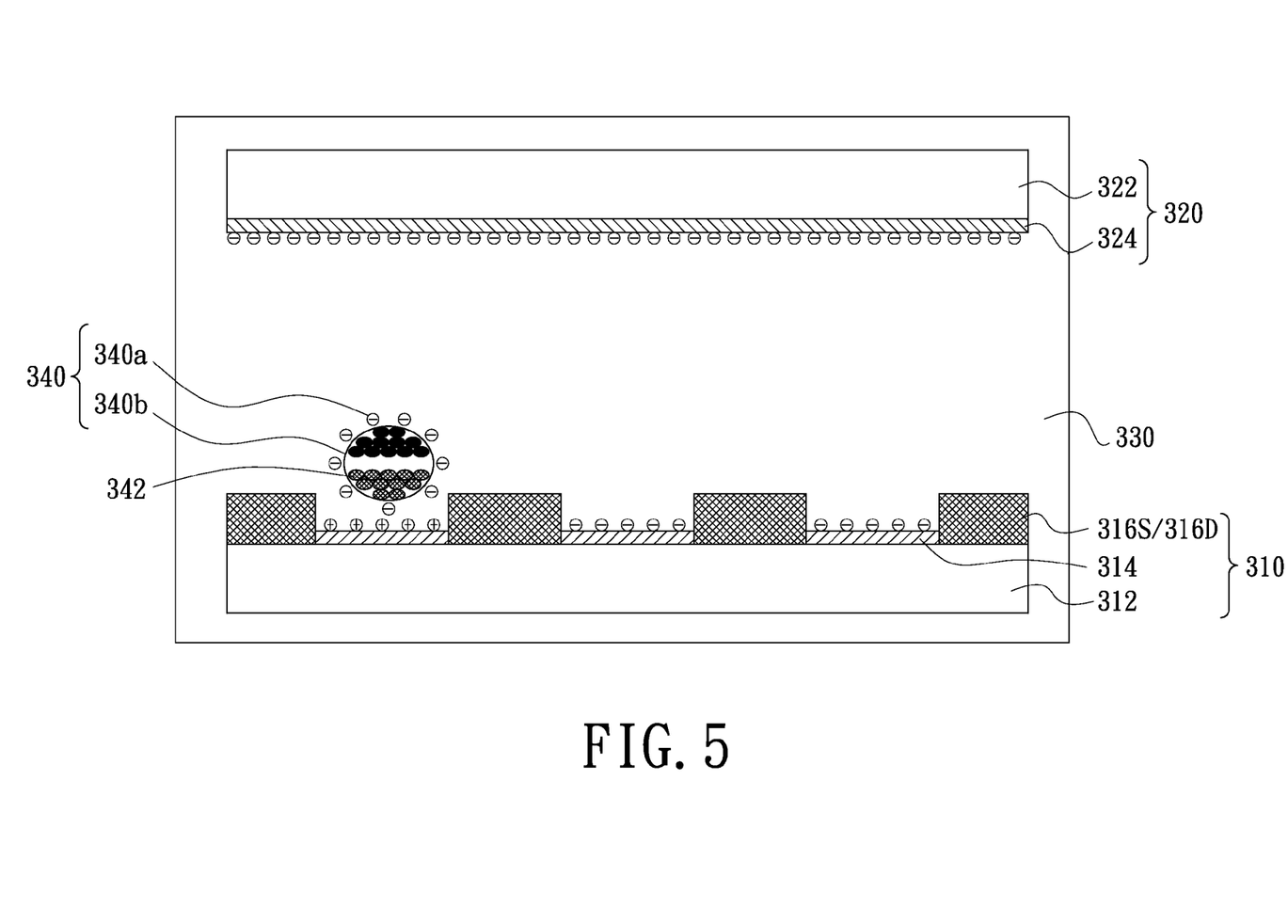
FIG. 5 is a schematic view illustrating the pixel electrode applied voltage according to another embodiment of the invention.

Furthermore, in another embodiment of the invention, other parts of the pixel electrodes 314 may have negative charges by applying DC voltage or AC voltage thereto while the parts of the pixel electrodes 314 have positive charges by applying DC voltage or AC voltage thereto, as shown in FIG. 5. Thus, the charged micro-capsules 340 with negative charges may be prevented from locating above the unpredetermined pixel electrode 314.

Referring to FIG. 3C again, for further checking the charged micro-capsules 340 are disposed only above the predetermined pixel electrode 314, the charged micro-capsules 340 unattracted above the pixel electrodes 314 may be removed by, for example, dumping method or centrifugal removing method after finishing the step shown in FIG. 3C.

Specially, the relative heights of the scan lines 316S and the data lines 316D disposed on the substrate 312 are higher than the height of the pixel electrodes 314 in this embodiment, so that the positions of the charged micro-capsules 340 attached to above the pixel electrodes 314 may be immovable and limited. Therefore, even the DC voltage or the AC voltage applied to the pixel electrodes 314 is removed after positioning the charged micro-capsules 340, the charged micro-capsules 340 is difficult to move.

Figure 6:
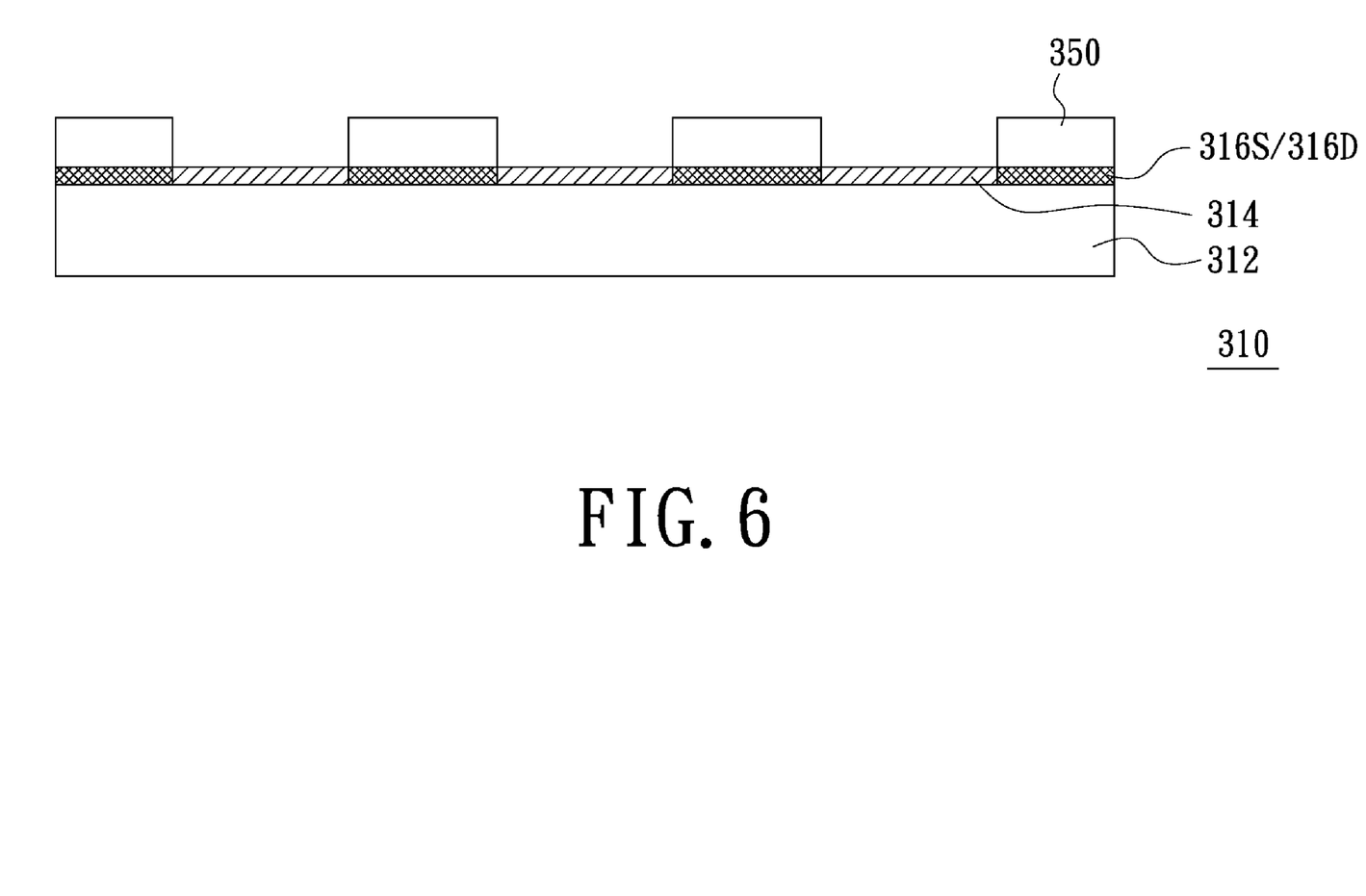
FIG. 6 is a schematic cross-section view illustrating the first electrode substrate according to another embodiment of the invention.

Besides, In another embodiment, a blocking layer 350 is formed on the first electrode substrate 310 before putting the first electrode substrate 310 into the electro-phoretic liquid 330, as shown in FIG. 6. The blocking layer 350 is, for example, disposed on the data lines 316D or the scan lines 316S disposed on the first electrode substrate 310 to separate the adjacent pixel electrodes 314. Therefore, after the charged micro-capsules 340 are attached to above the pixel electrodes 314 by the charges thereof, the positions of the charged micro-capsules 340 may be limited by the blocking layer 350.

Figure 7:
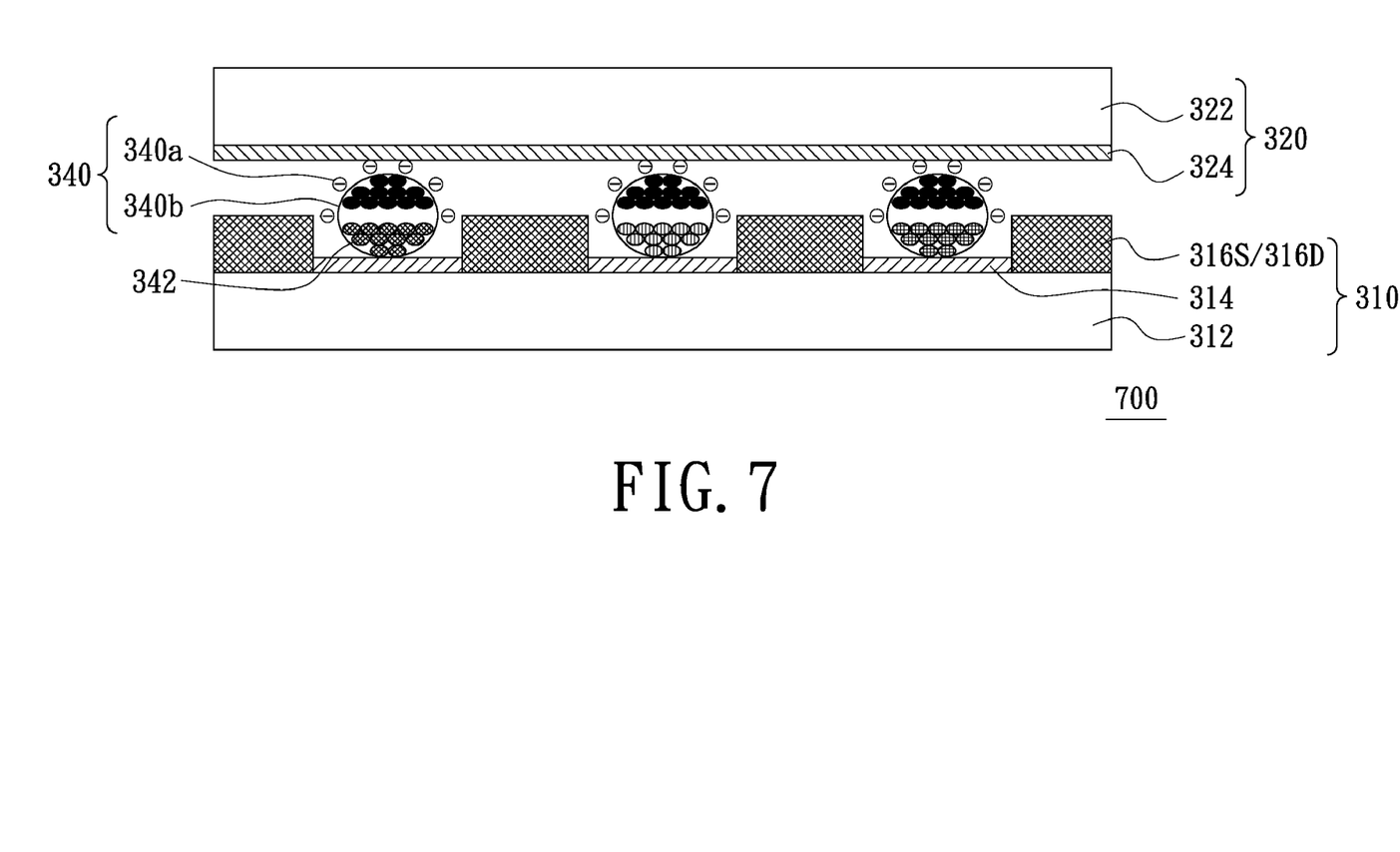
FIG. 7 is a schematic cross-section view illustrating an electro-phoretic display fabricated by the method of the invention.

In the aforementioned embodiments, many charged micro-capsules having the colorful charged particles with the same color are positioned at the same time. Those skilled in the art should know that a colorful electro-phoretic display 700 shown in FIG. 7 may be fabricated by putting the charged micro-capsules having the colorful charged particles with different colors into the electro-phoretic liquid and performing the mentioned follow-up steps in turns. The colorful electro-phoretic display 700 may display an image with single original color.

Specially, the charged micro-capsules having the colorful charged particles with different colors may be putted into the electro-phoretic liquid at the same time in the invention.

Figure 8:
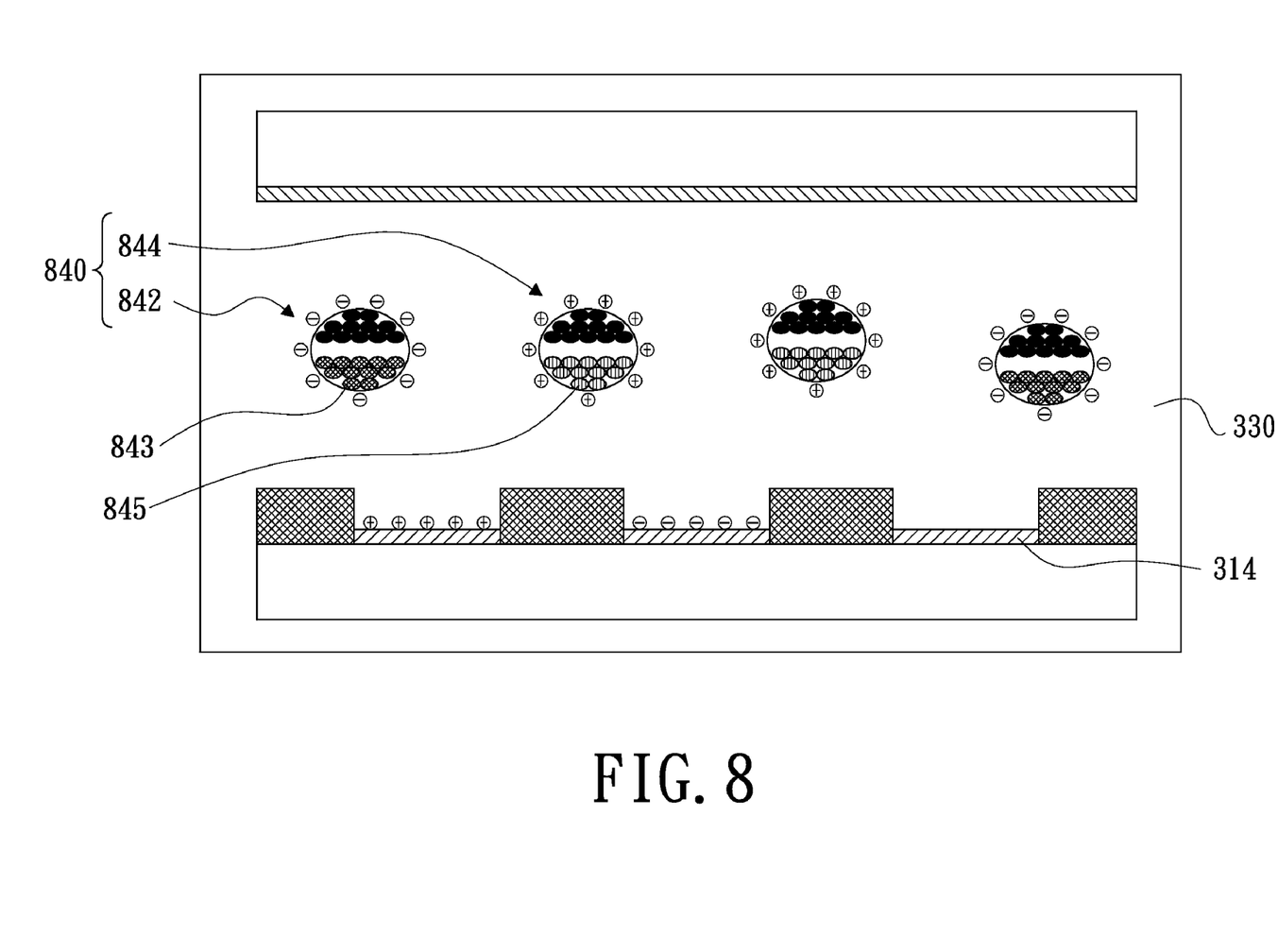
FIG. 8 is a schematic view illustrating the positioning of the charged micro-capsules according to another embodiment of the invention.

FIG. 8 is a schematic view illustrating the positioning of the charged micro-capsules according to another embodiment of the invention. Referring to FIG. 8, the charged micro-capsules 840 putted into the electro-phoretic liquid 330 comprises a plurality of first charged micro-capsules 842 and a plurality of second charged micro-capsules 844. The electricity of the first charged micro-capsules 842 is contrary to the electricity of the second charged micro-capsules 844 and the color of the colorful charged particles 843 within the first charged micro-capsules 842 is different from the color of the colorful charged particles 845 within the charged micro-capsules 844.

In this embodiment, the first charged micro-capsules 842 may have negative charges and the second charged micro-capsules 844 have positive charges. Accordingly, parts of the pixel electrodes 314 have positive charges by applying AC voltage or DC voltage thereto, so that the first charged micro-capsules 842 are attached to thereabove. Another part of the pixel electrodes 314 have negative charges, so that the second charged micro-capsules 844 are attached to thereabove.

In this embodiment, the first charged micro-capsules 842 or the second charged micro-capsules 844 unattracted to above the pixel electrodes 314 may be removed after positioning the first charged micro-capsules 842 and the second charged micro-capsules 844. The removing method is described in the aforementioned embodiments, it is unnecessary to say herein.

Additionally, the charged micro-capsules having the colorful charged particles with another color may be positioned after positioning the first charged micro-capsules 842 and the second charged micro-capsules 844 in this embodiment. Therefore, a color electro-phoretic display which can display images with one of the three original colors is fabricated.

In summary, the micro-capsules with colorful charged particles are polarized to the charged micro-capsules first in the process of fabricating electro-phoretic display in the invention. Next, the charged micro-capsules are attached to above the pixel electrodes by applying voltage thereto. After that, the positioning process of the charged micro-capsules is done. Thus, the charged micro-capsules may be disposed immediately on the first electrode substrate in the invention and the pixel electrodes are corresponded respectively to the charged micro-capsules having the colorful charged particles with the same color. Therefore, the electro-phoretic display fabricated by the method of the invention can display images with single original color and has high reflectivity, high transmittance and improved chromatic performance.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of fabricating an electro-phoretic display, comprising the steps of:
   providing an electro-phoretic liquid;
   putting a first electrode substrate and a second electrode substrate into the electro-phoretic liquid, wherein the first electrode substrate comprising a substrate and a plurality of pixel electrodes disposed thereon is disposed above the second electrode substrate;
   forming at least a charged micro-capsule;
   putting the at least a charged micro-capsule between the first electrode substrate and the second electrode substrate; and
   making the charge of at least one of the pixel electrodes be inverse to the charge of the at least a charged micro-capsule for attracting the at least a charged micro-capsule to above the at least one of the pixel electrodes.

2. The method as recited in claim 1, further comprising the step of making the charge of other pixel electrodes equal to the charge of the at least a charged micro-capsule after making the charge of at least one of the pixel electrodes inverse with the charge of the at least a charged micro-capsule.

3. The method as recited in claim 1, further comprising the step of removing the charged micro-capsules unattracted to above the at least one pixel electrode after making the charge of at least one of the pixel electrodes inverse to the charge electricity of at least one of the pixel electrodes inverse to the electricity of the at least a charged micro-capsule if the at least a charged micro-capsule comprises a plurality of charged micro-capsules.

4. The method as recited in claim 3 wherein the process of removing the charged micro-capsules unattracted to above the at least one pixel electrode comprises dumping method or centrifugal removing method.

5. The method as recited in claim 3, wherein the charged micro-capsules have a plurality of colorful charged particles with the same color respectively.

6. The method as recited in claim 1, wherein the process of making the charge of at least one of the pixel electrodes be inverse to the charge of the charged micro-capsule comprises applying an AC voltage or a DC voltage to the at least a pixel electrode.

7. The method as recited in claim 6, further comprising the step of removing the AC voltage or the DC voltage applied to the at least a pixel electrode after attracting the at least a charged micro-capsule to above the at least one of the pixel electrodes.

8. The method as recited in claim 1, wherein the steps of forming the at least a charged micro-capsule comprising:
    providing at least a micro-capsule and a plurality of charges; and
    making the charges attach to the at least a micro-capsule for forming the at least a charged micro-capsule.

9. The method as recited in claim 8, wherein the process of making the charges attach to the at least a micro-capsule comprises attaching method or copolymerizing method.

10. The method as recited in claim 1, further comprising making the charge of the second electrode substrate equal to the charge of the at least a charged micro-capsule.

11. The method as recited in claim 10, wherein the process of making the charge of the second electrode substrate equal to the charge of the at least a charged micro-capsule comprises the step of applying AC voltage or DC voltage on the second electrode substrate.

12. The method as recited in claim 1, wherein the at least a charged micro-capsule comprises at least a first charged micro-capsule and at least a second charged micro-capsule, the at least a first charged micro-capsule has a plurality of first colorful charged particles and the at least a second charged micro-capsule has a plurality of second colorful charged particles, the steps of making the charge of at least one of the pixel electrodes be inverse to the charge of the charged micro-capsule comprise:
    making the charge of at least one of the pixel electrode inverse to the charge of the at least a first charged micro-capsule; and
    making the charge of at least another one of the pixel electrode inverse to the charge of the at least a second charged micro-capsule.

13. The method as recited in claim 1, further comprising forming a blocking layer on the first electrode substrate before putting the first electrode substrate in the electrophoretic liquid, wherein the adjacent pixel electrodes are separated by the blocking layer.

* * * * *